(12) United States Patent
Violleau et al.

(10) Patent No.: US 7,711,783 B1
(45) Date of Patent: May 4, 2010

(54) GENERIC EVENT NOTIFICATION SERVICE FOR RESOURCE-CONSTRAINED DEVICES

(75) Inventors: Thierry Violleau, Poissy (FR); Tanjore S. Ravishankar, San Jose, CA (US); Sebastian Jürgen Hans, Berlin (DE); Matthew R. Hill, San Jose, CA (US)

(73) Assignee: Oracle America, Inc., Menlo Park, CA (US)

( * ) Notice: Subject to any disclaimer, the term of this patent is extended or adjusted under 35 U.S.C. 154(b) by 843 days.

(21) Appl. No.: 11/454,318

(22) Filed: Jun. 16, 2006

(51) Int. Cl.
*G06F 15/16* (2006.01)
(52) U.S. Cl. .................................... 709/206; 719/318
(58) Field of Classification Search ................ 709/206; 719/318
See application file for complete search history.

(56) References Cited

U.S. PATENT DOCUMENTS

| | | | |
|---|---|---|---|
| 7,089,211 B1 * | 8/2006 | Trostle et al. ................. | 705/51 |
| 7,127,605 B1 * | 10/2006 | Montgomery et al. ....... | 713/150 |
| 7,356,529 B1 * | 4/2008 | Ennis et al. .................... | 707/6 |
| 7,472,396 B2 * | 12/2008 | Jacobs et al. ................. | 719/318 |
| 2006/0080394 A1 * | 4/2006 | Goodman et al. ........... | 709/206 |

* cited by examiner

*Primary Examiner*—Yves Dalencourt
*Assistant Examiner*—Michael C Lai
(74) *Attorney, Agent, or Firm*—Gunnison, McKay & Hodgson, L.L.P.; Forrest Gunnison

(57) ABSTRACT

A generic event notification service for a resource-constrained device is provided. One method includes receiving an event having a unique event identifier, and determining whether an event-producing application is authorized to fire the event. Upon a determination of authorization to fire the event, a determination is made whether any event-consuming applications are authorized by the event-producing application to receive the event. Upon a determination of authorization to receive the event, the event is forwarded to each authorized event-consuming application. In this manner, secure, flexible, generic, and uniform application interaction is facilitated.

11 Claims, 10 Drawing Sheets

| Event-producing Application_0 | Authorized Event-consuming Applications |
|---|---|
| Event-0 | Application_i ⋮ |
| Event-1 ⋮ | Application_j ⋮ |
| Event-producing Application_1 | Authorized Event-consuming Applications |
| ⋮ | ⋮     ⋮ |

Access Control Lists ~304B

Fig. 9

GENERIC EVENT NOTIFICATION SERVICE FOR RESOURCE-CONSTRAINED DEVICES

BACKGROUND OF THE INVENTION

1. Field of the Invention

The present invention relates generally to computer software interaction, and more particularly to event notification services for resource-constrained devices.

2. Description of Related Art

Smart cards and other resource-constrained devices provide various services for users via small, easily portable devices. For example, a user inserts a smart card 100 into a card acceptance device 120 such as a bank terminal, which in turn communicates with a remote device 130 that is running a remote application 131. The user completes a banking transaction via smart card 100 and bank terminal 120, removes smart card 100 from bank terminal 120, and retains smart card 100 for future transactions.

To provide a variety of services via smart card 100, smart card 100 typically supports multiple on-card applications, of which banking application 110 is one example. On-card applications generally refer to applications executed on the smart card. On-card applications not only execute on the smart card, but also can interact with one another to provide various services. In some cases, the on-card applications further interact with off-card applications. Off-card applications generally refer to applications executing on a device other than smart card 100.

To provide on-card applications, developers build and test programs using standard software development tools and environments and convert the programs into a form that is installed on smart card 100. For example, Java Card' technology enables programs written in the Java' programming language to be installed and executed on a variety of smart cards and other resource-constrained devices. (Java™ is a trademark of Sun Microsystems, Inc., of Santa Clara, Calif., U.S.)

To protect the services enabled by smart cards, the programs and operations underlying the transactions have associated security mechanisms such as firewalls that prevent one on-card application from accessing information in a context of another on-card application. Firewalls ensure that one application cannot access the data or code of another application unless that application has provided an interface for access, such as a shareable object interface.

The limited resources available on smart card 100 cannot support more generalized approaches for communications between each of the multiple applications or some subset of the multiple applications typically found on smart card 100. For example, if application 110 and another application on smart card 100 used an event driven system to communicate, it is necessary for application 110 to include any classes, etc., required to support the event driven system. Similarly, if the other application wants to use an event driven system, that application must include the classes, etc., required to support that event driven system. Since by definition resources on a resource-constrained device such as smart card 100 are limited, there is not sufficient storage for each application to support such an event driven system and so the implementation of such systems is not considered feasible.

SUMMARY OF THE INVENTION

The prior art issues associated with security, flexibility, genericity, and uniformity of application interaction with respect to resource-constrained devices are eliminated by one embodiment of this invention. This embodiment facilitates generic event notification services, which results in expanded, secure application interaction.

One embodiment of the present invention includes a method implemented in a resource-constrained device. The method includes receiving, by a generic event notification service executing on the resource-constrained device, an event fired by a first event-producing application executing on the resource-constrained device. The event has a unique event identifier. The generic event notification service controls communications between applications executing on the resource constrained device, using events, which in one embodiment are implemented as shareable interface objects. The method further includes determining, by the generic event notification, whether the first event-producing application is authorized to fire the event to avoid impersonation of an event source.

The method further includes determining, by the generic event notification service, event-consuming applications authorized by the first event-producing application to receive the event upon the generic event notification service finding the first event-producing application is authorized to fire the event.

The method further includes forwarding, by the generic event notification service, the event to each event-consuming application authorized by the first event-producing application to receive the event.

Thus, in one embodiment, events are implemented as Shareable Interface Objects, and, therefore, conform to the security rules and requirements imposed on Shareable Interface Objects. Consequently, the generic event notification service complies with and builds on an inter-application communication service.

Upon event generation by an event-producing application, an event listener or event listeners registered by an event-consuming application execute within the context of the event-consuming application. Since the events are Shareable Interface Objects of the event-producing applications, context switches from the event-producing application's context to the event-consuming application's context occur when event listeners of event-consuming applications invoke methods on the event objects. The firewall associated with an application's context enforces standard security containment between two applications, yet permits the two applications to intercommunicate via the Shareable Interface Objects.

The registry, in one embodiment, allows for easier/more flexible management of applications on a resource-constrained device by allowing of late binding of applications thru events. In this embodiment, event-producing applications do not have to be installed before event-consuming applications can register for events fired by the uninstalled event-producing applications.

Also, in one embodiment, an application is prevented by the application programming interface from impersonating another application by altering the source of the event, i.e., the event source is automatically and securely set by the implementation and cannot be changed by an application. Hence, the event source is secured to avoid impersonation.

Embodiments are best understood by reference to the following detailed description when read in conjunction with the accompanying drawings.

BRIEF DESCRIPTION OF THE DRAWINGS

FIG. 9 illustrates access control lists of the dynamic event notification registry of the generic event notification service of FIG. 3, according to one embodiment of the present invention.

Figure 1:
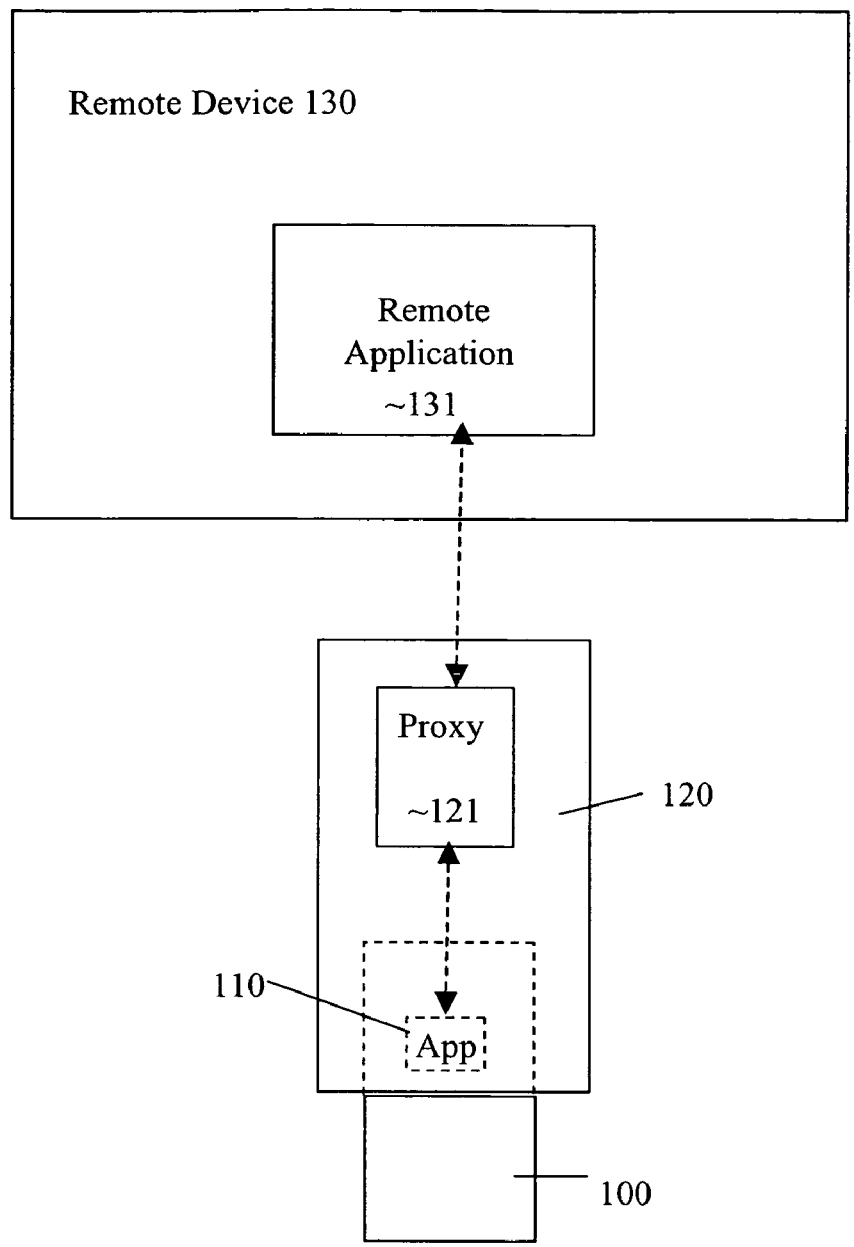
FIG. 1 illustrates an exemplary smart card communication environment of the prior art.

Embodiments are best understood by reference to the following detailed description when read in conjunction with the accompanying drawings.

GLOSSARY OF TERMS

As used in the following detailed description, an interface is a named collection of method definitions and defines a protocol of behavior that can be implemented by any class in the class hierarchy. An interface defines a set of methods but does not implement them.

As used in the following detailed description, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described herein.

As used in the following detailed description, resource-constrained devices include devices having limited resources and/or limited resource capacity. Resources include processors and memory. One example of a resource-constrained device is a smart card, sometimes referred to as a card, having limited processing capacity and limited memory resources. One example of a smart card is a secure portable device such as a Java Card™ technology-enabled device, or the like. Java Card™ technology is described in Chen, Z., Java Card™ Technology for Smart Cards—Architecture and Programmer's Guide, Boston, Addison-Wesley, 2000. (Java Card™ is a trademark of Sun Microsystems, Inc., Santa Clara, Calif., U.S.)

As used in the following detailed description, remote devices are computer devices and other devices with a processor and memory, other than a particular resource-constrained device, capable of direct and/or indirect interaction with the resource-constrained device.

As used in the following detailed description, a resource-constrained device may support a multi-application environment, i.e., multiple applications coexist on the resource-constrained device. One example of a multi-application environment is a Java Card™ Runtime Environment (JCRE). The JCRE is a computing environment, or platform, from Sun Microsystems that can run applications developed using the Java™ programming language and sets of development tools. The JCRE includes one or more JCRE contexts.

As used in the following detailed description, an event listener, sometimes called listener, is a piece of application code that is invoked when the event for which the event listener is registered occurs, and which may further process/handle the event.

As used in the following detailed description, an event registry is a table/structure associating event types to event listeners that were registered to handle the corresponding events.

As used in the following detailed description, a JCRE context is a system context that manages card resources—processor, memory, I/O interfaces and other system resources. Application containers execute in a JCRE context.

As used in the following detailed description, a container manages application contexts and application lifecycle.

As used in the following detailed description, an application context includes one or more executing applications.

As used in the following detailed description, an application includes, for example, web applications, e.g., applications servicing requests over the HTTP protocol, and applet applications, i.e., applications servicing requests over the ISO7816 APDU protocol. Web applications include at least one servlet. Applet applications include at least one applet.

As used in the following detailed description, a servlet is a program that when executed generates dynamic content and interacts with off-card web clients using a request-response paradigm. Servlets can also interact with other on-card applications. Servlets execute on a computer device such as a resource-constrained device.

As used in the following detailed description, an applet is a program that when executed interacts with off-card APDU clients using a request-response paradigm. Applets can also interact with other on-card applications. Applets execute on a computer device such as a resource-constrained device.

As used in the following detailed description, an event-producing application is an application, platform, component, or resource capable of generating an event.

As used in the following detailed description, an event-consuming application is an application, platform, or component capable of receiving an event.

As used in the following detailed description, an object is an instantiation of an object-oriented computer program language entity, such as a class.

As used in the following detailed description, a card acceptance device is any device or connection for interfacing a resource-constrained device with another device. Examples of card acceptance devices include, but are not limited to: devices in the prior art referred to as card acceptance device; a USB interface that directly connects the resource-constrained device to the terminal (phone or desktop); contactless readers called proximity coupling devices (PCD), which use a RF interface to connect to a resource-constrained device; and other interfaces such as MMC (multi-media card) and NFC (near field communication) for connecting a resource-constrained device to another device.

DETAILED DESCRIPTION

According to one embodiment of the invention, a generic event notification service 204 on a resource-constrained device 200 overcomes the shortcomings of the prior art and allows resource-constrained device 200 to securely conduct event-based transactions, for example between any combination of applications executing on resource-constrained device 200, e.g., between any combination of a plurality of applications 210A, 210B to 210N. In one embodiment, event-based transactions between any of the plurality of applications 210A, 210B to 210N and another application 231, e.g., a remote application, executing on a different platform, e.g., remote device 230 is also optionally supported.

Generic event notification service 204 allows applications 231, 210A, 210B to 210N to securely communicate asynchronously with each other via event notification. Generic event notification service 204 facilitates secure, efficient, and extensible communication services for applications 210A to 210N executing on resource-constrained device 200.

More particularly, generic event notification service 204 provides an event-based communication system to facilitate secure, flexible communication between applications on resource-constrained device 200, e.g., between application 210B and 210N, as well as between an application, e.g., application 210B, executing on resource-constrained device 200 and application 231 executing on a remote device 230.

Generic event notification service 204, as explained more completely below, provides a set of predefined events and also supports application-specific events. A uniform naming scheme is used for all events that allows for easier integration of applications into domain-specific solution systems.

Generic event notification service 204 is a platform service, or alternatively a container service, and builds on inter-application communication services supported on resource-constrained device 200 and thereby leverages the security features of the inter-application communication services.

As explained more completely below, the uniform naming scheme utilizes a novel hierarchical namespace for naming events used in generic event notification service 204. The hierarchical namespace and the associated unique name for each event facilitates implementing a security policy by generic event notification service 204.

Also, in one embodiment, a registry is used by generic event notification service 204, sometimes referred to as service 204, to determine applications, either on resource-constrained device 200 or remote applications, (i) that are permitted to receive events generated by an application on resource-constrained device 200 and (ii) that are registered with service 204 to receive the events. In one embodiment, the registry includes a plurality of lists that are used by service 204 in implementing its security policy.

In addition to application-specific generated events, there may also be events associated with the resource-constrained device platform and standard application events, both of which are implemented as predefined events. As used herein, an event is an event object that is used to communicate information from one application, component, or resource to an event listener of another application interested in receiving that information. The event objects, as explained more completely below, are a set of extensible event objects.

Generic event notification service 204 controls which applications are permitted to subscribe for receipt of an event or events from a particular event-producing application. In one embodiment, each event-producing application, upon deployment on smart card 200, specifies which event-consuming applications can subscribe to each event fired by that event-producing application. Service 204 checks the subscription information provided by the event-producing application to determine whether another application is permitted to subscribe to the event, and, if so, registers the application as an event-consuming application. In one embodiment, an event listener for the event-consuming application is registered.

When an event is fired by application 210B, for example, the event is sent to generic event notification service 204. Generic event notification service 204 first determines whether the event was generated by the appropriate event-producing application. If the event was not generated by the appropriate event-producing application, service 204 does not forward the event and so prevents use of the event communication system by other than authorized event-producing applications.

If the event was from the appropriate event-producing application, service 204 determines the event-consuming applications that have registered to be notified of that event, e.g., any one or any combination of applications 210A, 210B . . . 210N, and remote application 231. Generic event notification service 204 forwards the event directly to each of the applications that registered for that event with service 204. As described more completely below, the use of the novel namespace facilitates event identification and the registry ensures a flexible means of integrating applications while eliminating prior art interdependency problems.

Generic Event Notification Service

Figure 2:
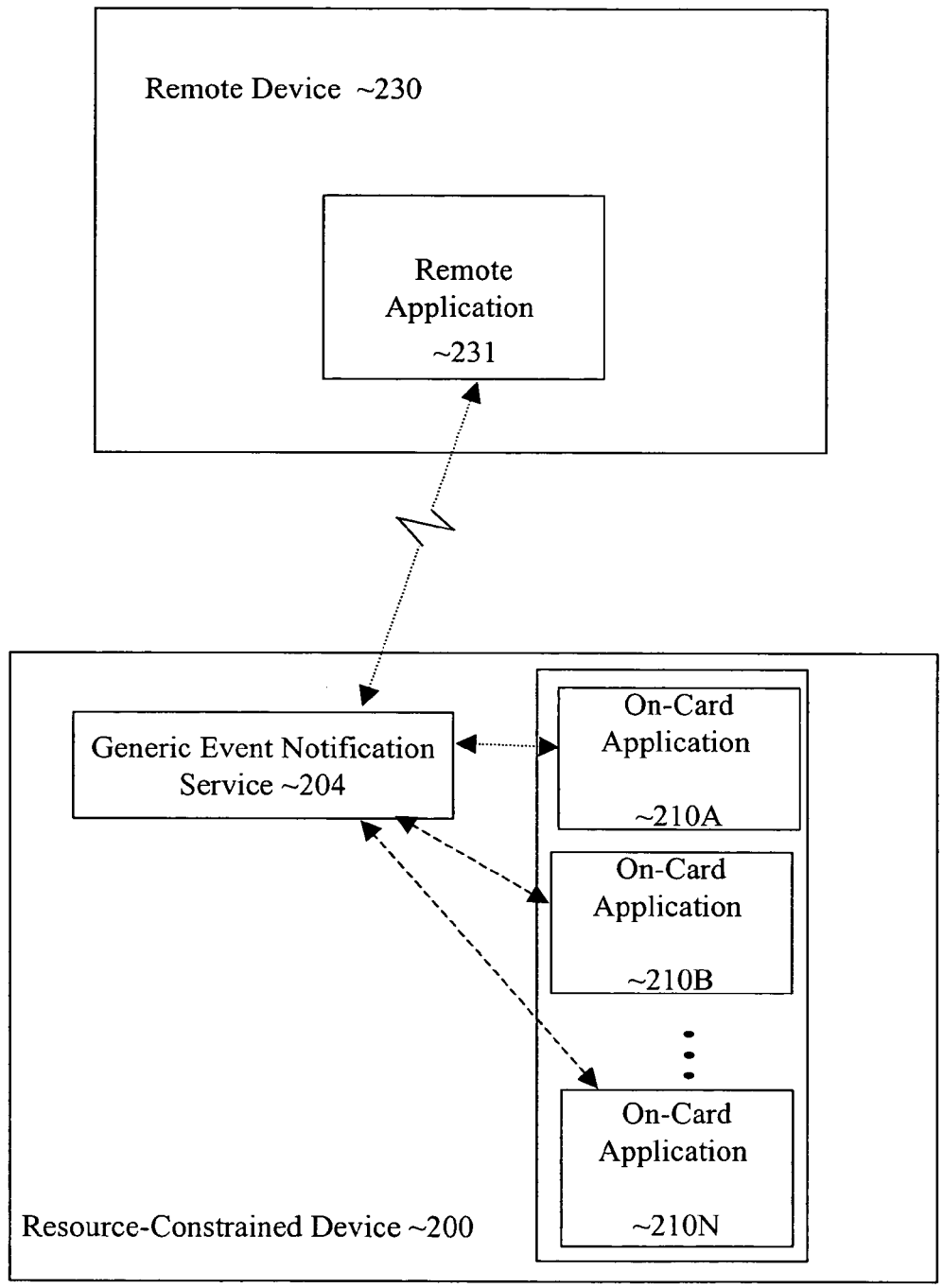
FIG. 2 illustrates an exemplary communication environment of a resource-constrained device having a generic event notification system, according to one embodiment of the present invention.
Figure 3:
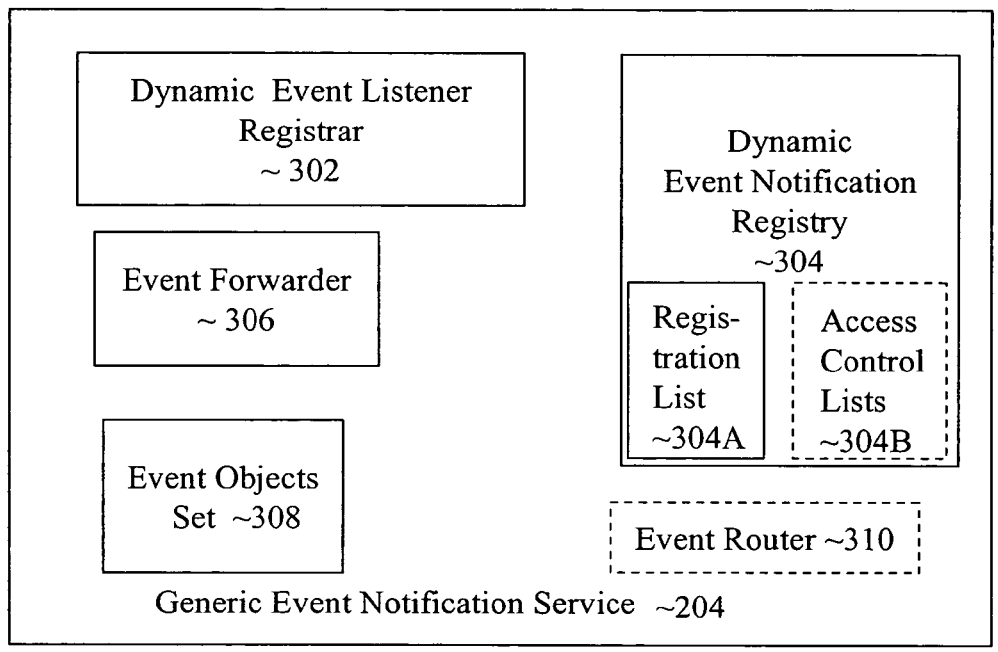
FIG. 3 illustrates a schematic of the generic event notification service of FIG. 2, according to one embodiment of the present invention.

FIG. 3 illustrates a block diagram of a generic event notification service 204 of FIG. 2, according to one embodiment of the present invention. Generic event notification service 204 includes a dynamic event listener registrar 302; a dynamic event notification registry 304; an event forwarder 306, an extensible event objects set 308, and an optional event router 310. Each of these components is described in more detail below. Also, the illustration of discrete components in FIG. 3 is illustrative only and is not intended to limit the invention to this particular embodiment. As described more completely below, parts of the various components can be intermingled to obtain the performance and results described and so the various components may not be discernible as discrete components in such an embodiment.

Dynamic event listener registrar 302, sometimes referred to as registrar 302, updates, as appropriate, dynamic event notification registry 304 in response to an event-consuming application requesting dynamic registration and/or dynamic unregistration for event notification. Thus, dynamic event notification registry 304, sometimes referred to as registry 304, contains a registration list 304A of event-consuming applications and associated event listeners, sometimes referred to as listeners, registered for notification of events from a particular event-producing application.

Registry 304 optionally includes access control lists 304B. Each access control list includes event-consuming applications authorized by an event-producing application to receive events fired by that event-producing application. Each event-producing application, in one embodiment, upon deployment provides an access control list for inclusion in access control lists 304B.

An event-producing application fires an event through generic event notification service 204. Event forwarder 306 initially treats the fired event as a request to forward the event, sometimes referred to as an event forward request. In processing the event forward request, event forwarder 306 first determines whether the event identifier of the fired event is from the event namespace for the event-producing application associated with that event. If the event is not from the correct namespace, service 204 generates an exception. Conversely, if the event identifier is from the correct namespace, event forwarder 306 looks up the registry entry in registry 304 for the event and invokes all the event listeners registered for the event.

In one embodiment, event forwarder 306 passes a parameter representing the event to the event listener for the event-consuming application and the event listener is executed in the context of the event-consuming application. Thus, event forwarder 306 verifies the event by ensuring that (1) that the event comes from the source authorized to generate the event; and (2) the event has not been altered to appear as if the event comes from an authorized source.

Figure 4:
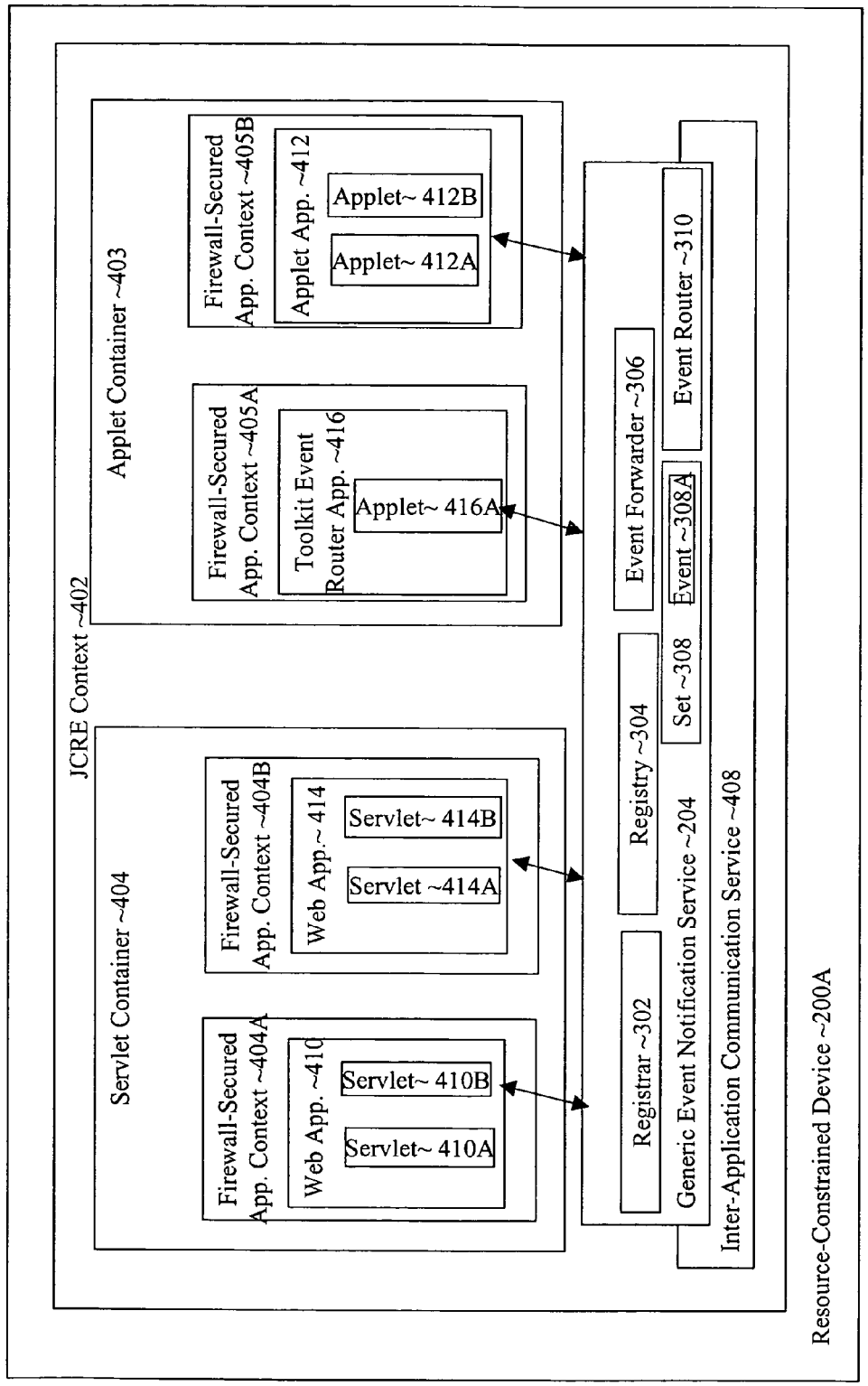
FIG. 4 illustrates a more detailed embodiment of the resource-constrained device of FIG. 2, according to one embodiment of the present invention.

Prior to considering the components of generic event notification service 204 in further detail, a more detailed embodiment of resource-constrained device 200 is presented as resource-constrained device 200A in FIG. 4. In FIG. 4, a multi-application environment Java Card' Runtime Environment (JCRE) is providing a JCRE context 402, which is a system context that manages one or more containers, e.g., servlet container 404 and applet container 403, which are executing on resource-constrained device 200A. The use of servlet container 404 and of applet container 403 is illustrative only and is not intended to limit the invention to this embodiment.

In view of this disclosure, one of skill in the art can implement a multi-application environment on a resource-constrained device that supports applications and generic event notification service 204.

Servlet container 404 further includes two web applications 410 and 414 that are each executing in a different firewall-secured application context, i.e.; firewall-secured application context 404A and 404B, respectively. Web application 410 includes servlets 410A and 410B, while web application 414 includes servlets 414A and 414B. One embodiment of an implementation of a servlet container and a web application is described in copending, commonly filed, and commonly assigned U.S. patent application Ser. No. 11/454,483, entitled "Persistence System for Servlet-based Applications on Resource-Constrained Devices" of Thierry Violleau, Tanjore S. Ravishankar, Sebastian Hans, and Matthew R. Hill, which is incorporated herein by reference in its entirety.

Applet container 403 further includes a toolkit event router application 416 and an applet application 412 that are each executing in a different firewall-secured application context, i.e., firewall-secured application contexts 405A and 405B, respectively. Toolkit event router application 416 includes applet 416A, while applet application 412 includes applets 412A and 412B.

JCRE context 402 also includes an inter-application communication service 408 that is executing on resource-constrained device 200A. Inter-application communication service 408 supports secure interaction of applications in different application contexts. Typically, object access between applets or servlets associated with applications executing in the same application context is permitted. Inter-application communication service 408, however, strictly controls object access between applets or servlets executing in differing applications' contexts to prevent security breaches and data corruption. To control access, one technique employed by inter-application communication service 408 is isolation of application contexts, e.g., isolation of contexts 404A, 404B, 405A, and 405B.

Isolation of application execution contexts 404A, 404B, 405A, and 405B means that an application, e.g., web application 410, executing in one context cannot access objects of another application executing in another context, e.g., web application 414, unless the other application explicitly provides an interface for access. Isolation is typically enforced via firewalls at the application context level. In this embodiment, firewalls permit access between applications only via interfaces.

In this example, interfaces for access across a firewall include Shareable Interface Objects, which enable bypass of the firewall. Using a shareable interface object, an application in one context can access an object of an application in another context, while maintaining appropriate levels of security.

In one embodiment, interapplication communication service 408 supports mutual authentication between event-producing applications and event-consuming applications, i.e., authentication by the application producing the event of the event-consuming application and vice versa. For example, in situations where both the event-producing application and the event-consuming application are deployed at once, mutual authentication occurs one time at registration of the event-consuming application. In another example, mutual authentication occurs at the time of a first event notification to the event-consuming application.

Thus, inter-application communication service 408 enables secure communications between objects in JCRE context 402. Generic event notification system 204 builds on the secure communication services provided by inter-application communication service 408 by controlling communication between applications using events. Generic event notification service 204 includes event objects set 308, sometimes referred to as set 308. Set 308 includes an event 308A. In this embodiment, events are implemented as Shareable Interface Objects in accordance with inter-application communication service 408 standards.

Registrar 302, registry 304, event forwarder 306, and event router 310 cooperatively manage communications via events of set 308, as previously described. Cross-firing and consumption of events between multiple applications are seamlessly effected.

To illustrate, upon receiving registration requests from web application 410 to register event listeners for notification of event 308A owned by applet application 412, registrar 302 checks access control lists 304B of registry 304 and verifies permissions for web application 410 to access event 308A. Registrar 302 registers, in registration list 304A, all event listeners of web application 410 associated with the event, i.e., listening for event 308A or listening for events of the type of event 308A. The registered event listeners listen for event 308A or events of the type of event 308A.

Applet application 412 fires event 308A having a unique event identifier as described more completely below. Event forwarder 306 receives event 308A and verifies the authenticity of event 308A by matching the registered event source for event 308A with the application that fired the event. Stated differently, event forwarder 306 verifies that the source of event 308A is authorized to fire event 308A. As explained more completely below, an application is prevented by the application programming interface from impersonating another application by altering the source of the event, i.e., the event source is automatically and securely set by the implementation and cannot be changed by an application.

If the event has been fired by the appropriate source, event forwarder 306 checks registration list 304A of registry 304 for event-consuming applications having event listeners registered to receive event 308A or events of the type of event 308A.

Event forwarder 306 determines that web application 410 has event listeners registered to receive event 308A. Event forwarder 306 forwards event 308A to all event listeners registered for this application—including those registered by web application 410—for receipt of event 308A or events of the type of event 308A.

Extensible Event Objects Set

Extensible event objects set 308, sometimes called set 308, includes a uniform set of events to underpin communications between components on resource-constrained device 200A.

Set 308 includes a uniform, generic, and comprehensive set of events. Events of set 308 are objects defined to encapsulate relevant information and implement any relevant behavior and/or methods. Methods, for example, include accessors.

In this embodiment, events are implemented as Shareable Interface Objects, and, therefore, conform to the security rules and requirements imposed on Shareable Interface Objects. In this manner, generic event notification service 204 complies with and builds on inter-application communication service 408. Alternatively, if inter-application communication service 408 defines a different technique for an application in one context to access an object of another application in a different context, that technique is used in implementing the event objects.

Events include extensible event objects of various types, i.e., event types. Event objects are defined from a common class or by extension of the common class. As explained more completely below, each event carries a universally unique, logical event identifier.

Figure 5:
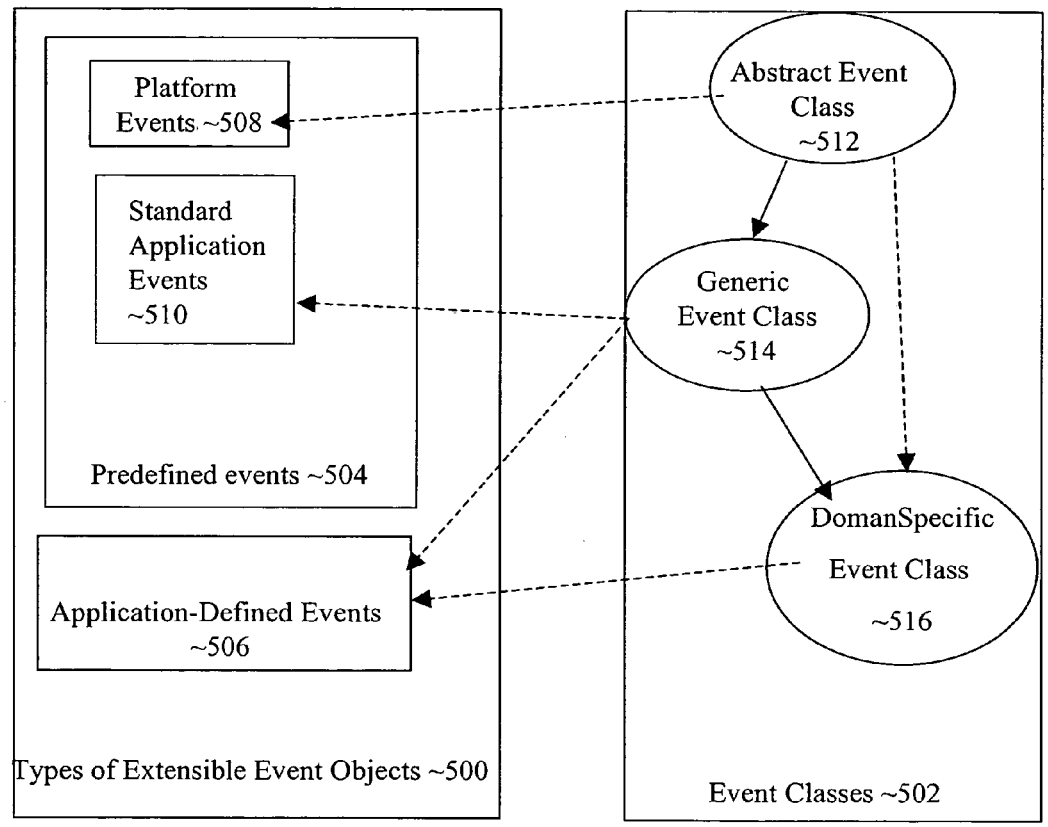
FIG. 5 illustrates types of extensible event objects and event classes, according to one embodiment of the present invention.

FIG. 5 illustrates types of extensible event objects 500 and event classes 502 for events in events objects set 308 (shown in FIG. 3), according to one embodiment of the present invention. Types of extensible event objects 500 span major categories of events, including, for example, platform events, standard application events, and application-defined events.

Types of Extensible Event Objects

Types of extensible event objects 500 include predefined platform and standard application events 504 and application-defined events 506. Predefined platform and standard application events 504 are provided through containers, in one embodiment, and are accessible to all applications. Predefined platform and standard application events 504 include predefined platform events 508 and predefined standard application events 510.

Platform events 508 are typically predefined events used to notify applications of platform-related conditions. Examples of platform events include alarm events; platform reset events; application loaded or unloaded events; service registration or unregistration events; and resource creation/update/deletion events. Platform events are predefined and cannot be instantiated or fired by an application.

Standard application events 510 are typically predefined events used by an application to provide notification of common or standard application-related conditions in an application's lifecycle.

Application-defined events 506 include events defined as required by an application's domain, e.g., an event applicable to a specific event-producing application.

Classes of Extensible Event Objects

Events are based on a base class 512. Base class 512 is extended as needed. Extension of base class 512 avoids the need to define new classes of events, which otherwise results in complicated programming measures, extensive coding, and excessive resource consumption associated with the code. In this manner, efficient programming efforts and prudent utilization of resources on resource-constrained devices are ensured.

Event classes 502 include base class 512, which in this embodiment is an abstract event class 512; generic event class 514; and domain-specific event class 516.

Abstract event class 512 defines an abstract class of events. To illustrate, one example of an abstract class named "Event" is:

public class abstract Event implements javacard.framework.Shareable {public abstract String getURI( );
    public final String getSourceURI( ) {
    // Retrieves from the context the web application URI
    // or the AID-based URI of the applet firing this
    //event.
    // Returns null for platform events.
    // Cannot be overridden.
      }
    }

Generic event class 514 defines generic event objects by extending abstract event class 512. Generic event objects are used to notify of general events, i.e., events that do not encapsulate domain-specific information/behavior. For example, generic event object instances include, for example, platform events 508 and standard application events 510.

To illustrate, a generic class named "GenericEvent" extends abstract class Event. An example of Class GenericEvent is:

public class GenericEvent extends Event {
    private final String uri;
    private final Object data;
    public GenericEvent(String uri, Object data) {this(uri);
      this.data=data;
    }
    public GenericEvent(String uri) {this.uri=uri; }
    public final String getURI( ){return uri; }
    public final Object getData( ) {return data; }

}

Domain-specific event class 516 defines specific event objects by extending either abstract event class 512 or generic event class 514. Specific event objects are used to notify of specific events, i.e., events that encapsulate domain-specific information/behavior. For example, new event objects can include various application-defined events 506 and various predefined events 504.

To illustrate, a domain-specific event class named "ResetEvent" extends generic class Event. An example of Class ResetEvent is:

public class ResetEvent extends Event {
    public static final String URI=
    "event:///platform/Reset";
    ResetEvent( ) { }
    // Can only be instantiated by the platform
    public final String getURI( ) {return URI; }
    . . .
    }

For ease of integration and use, an event-producing application can fire an instance of generic event class 514 with an application-specific identifier, as explained more completely below. When an event-producing application defines new event objects, the classes must be shared by or copied into both the event-producing application and the event-consuming applications. While generic event objects provide a flexible way of integrating applications, this flexibility must be balanced with the lack of domain-specific encapsulation in generic event objects.

Event Identifiers

Figure 6:
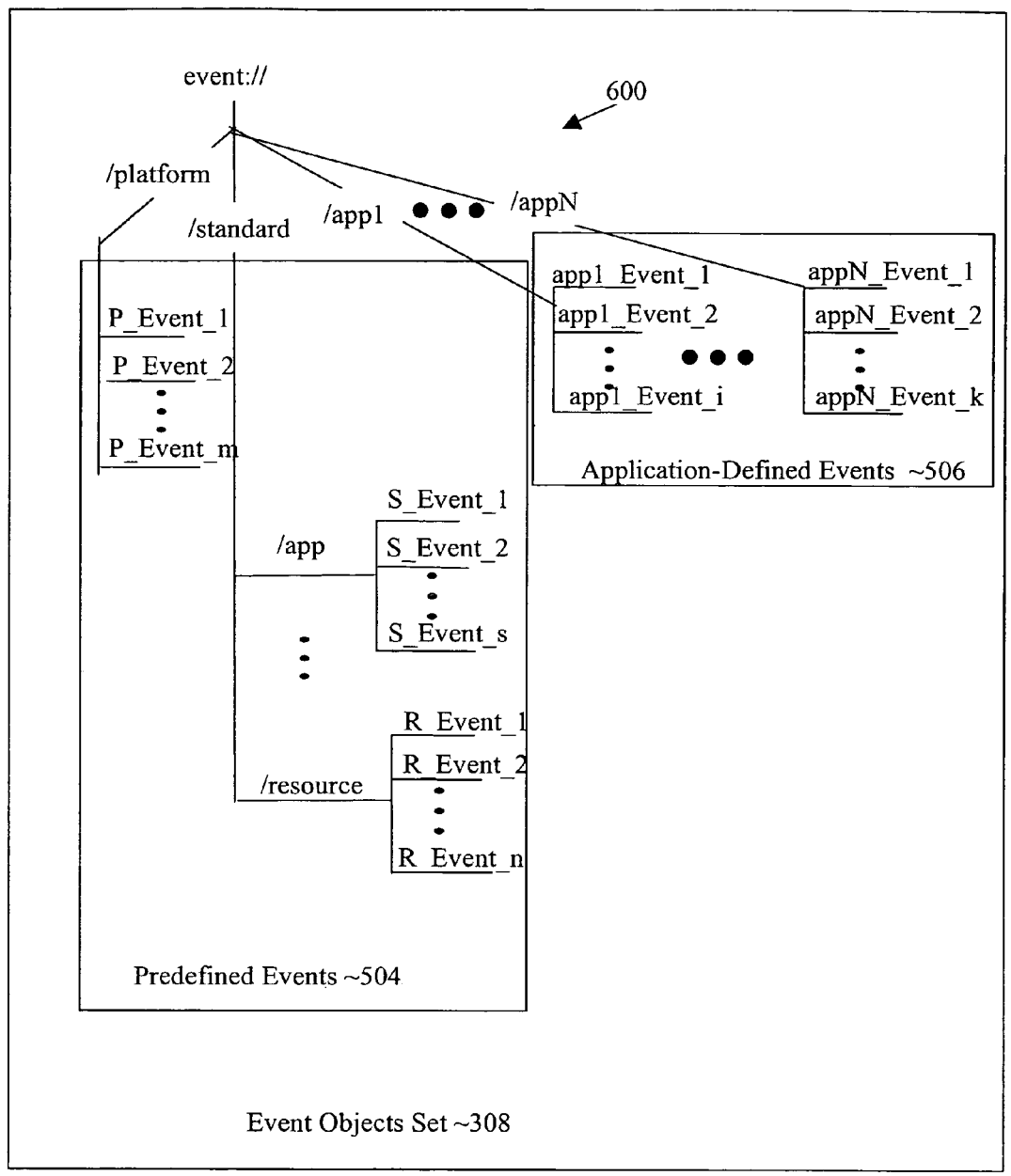
FIG. 6 illustrates a hierarchical event namespace, according to one embodiment of the present invention.

A unique event identifier identifies each event. The event identifiers of events of set 308 are organized according to a specific uniform resource identifier (URI) scheme organized into a hierarchical event namespace 600 (FIG. 6). The scheme is sometimes referred to as a Uniform Resource Identifier (URI) event scheme. Each event has an associated unique event identifier in hierarchical event namespace 600, sometimes called namespace 600. Namespace 600 is laid out so the event identifiers for predefined platform events, predefined standard events, and application-defined events cannot collide.

Moreover, event identifiers for application-defined events are organized in namespace 600 so that application-defined events of one event-producing application cannot collide with the application-defined events of another event-producing application. In this manner, multiple applications app1 to appN can interoperate seamlessly.

Previously, a URI identified a resource. The URI typically included fields for a scheme and a resource name. The scheme typically included an identifier for an access mechanism to access the resource and an identifier for the computer device hosting the resource, i.e., a hostname. The computer device hosting the resource is sometimes called a host. The resource name was unique in terms of the specific host owning the resource. Thus, a general URI took the form:

<scheme>://<authority><resource name>

In this manner, the URI uniquely identified a resource and the means to reach that resource, i.e., the scheme or access mechanism. One example of a request for a resource that utilizes a previous URI scheme identifying a resource is a hypertext transfer protocol (http) request, structured, for example, as:

http://host-1/purse where "http" is the specific access method and "host-1" identifies the unique host name of the host owning a requested resource named "purse."

Advantageously, a novel set of URIs is organized in hierarchical event namespace 600 so that each event in event objects set 308 is identified uniquely. Hierarchical event namespace 600 is a collection of event identifiers for event objects, sometimes called events, of set 308.

Event identifiers include absolute event identifiers and relative event identifiers. Note that in one embodiment, the application-specific event namespace for a servlet based application, such as applications app1 to appN, is defined by the uniform resource identifier for that application, e.g., /app1 for application app1.

Figure 7:
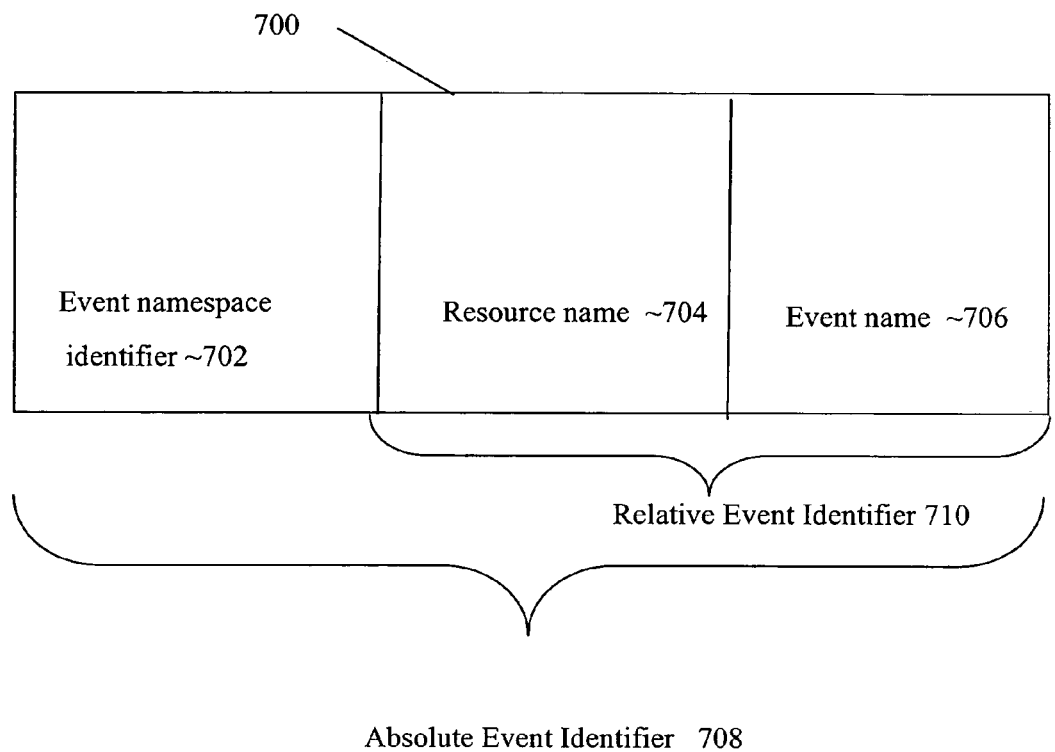
FIG. 7 illustrates fields of an event identifier, according to one embodiment of the present invention.

FIG. 7 illustrates the fields of an event identifier 700 in hierarchical namespace 600, according to one embodiment of the present invention. Event identifier 700 includes an absolute event identifier 708 and a relative event identifier 710. In this embodiment, absolute event identifier 708 includes an event namespace identifier 702, a resource name 704, and an event name 706, while relative event identifier 710 includes resource name 704, and event name 706.

The inclusion of event name space identifier "event:///" as the root differentiates hierarchical event namespace 600 from the namespace of the previous URI scheme identifying a resource; e.g., an HTTP/HTTPS request namespace. In combination with resource name 704 and event name 706, event name space identifier 702 provides a universally unique identifier for an event.

Absolute Event Identifiers

Absolute event identifiers, e.g., absolute event identifier 708, identify events in full form. In one general form of this embodiment, an absolute event identifier in hierarchical event namespace 600 takes the form:

<event scheme>://<authority><resource name><event name> or

<event name space identifier><resource name><event name> where <event name space identifier> is in the form <event scheme>://<authority>.

Because, in this embodiment, events are not network-aware and are restricted to entities on a specific host, e.g., resource-constrained device 200A (FIG. 4), the authority field is by default omitted. Thus, in this embodiment, the authority is, by default, not used in event identifier 700 and is not included in absolute identifier 708.

Similarly, in this embodiment, by default, the authority is omitted from the specific URI event scheme. However, the authority field is useful in a system that uses different registries in generic event notification system 204 such as for differentiating between events defined by applications using different application identification schemes such as AID-named applets. Thus, in this embodiment, by default, absolute event identifier 708 has a form:

<event namespace identifier><resource name><event name>

One example of an absolute event identifier is:
event:///purse/debited where "event:///" is the event namespace identifier; "purse" is the resource name for an event-producing application; and "debited" is the event name owned by resource "purse". Application "purse" is unique at the host level, e.g., with respect to resource-constrained device 200A. Event "debited" is unique at the resource level, e.g., with respect to application "purse". Providing unique resource name 704 and extending resource name 704 with unique event name 706 provides both unique absolute event identifier 708 and a uniform naming scheme for events.

Event namespace identifier 702 identifies the scheme as a URI event scheme. Event namespace identifier 702 provides means to designate generically the event as an on-resource-constrained device event.

In general, resource name 704 identifies a resource on the host, which is resource-constrained device 200A. Resource names 704 include any identifier for a resource or group of resources. Also, resource name 704 can be broken into sub-units, e.g., where an application has multiple functions and a unique set of events for each of the functions.

In one embodiment, resource names are categorized according to event types 500, e.g., predefined platform and standard application events 504 and application-defined events 506. Resource name 704 indicates the type of event that is used, e.g., "Platform" for predefined platform events; "standard" for predefined standard application events; and the application name of the event-producing application for application-defined events.

Resource names 704 for predefined platform and standard application events 504 specify well-defined sets of events, including a set of platform events 508 and a set of standard application events 510.

Platform events 508, as previously described, typically notify of platform-related conditions.

Platform events are predefined and are not typically instantiated or fired by an application.

Resource name 704 is assigned to designate a namespace for a set of events that is fired by the platform. For example, designated resource name 704 is "platform" and absolute event identifier 708 takes the format:

event:///platform/<event name>

The portion of hierarchical event namespace 600 associated with these identifiers is branch "/platform". For example, one event in hierarchical event namespace 600 associated with a platform event is event:///platform/P_Event_1 (FIG. 6).

Standard application events 510, as previously described, typically notify of common or standard application-related conditions that can be fired by an application on resource-constrained device 200A. Resource name 704 is assigned "Standard" to designate an application event namespace for a set of common events applicable to all applications, i.e., events that any application can fire. The standard application event namespace defines a set of event with a common, well-defined semantic applicable to all applications or categories of applications. For this reason, the resource name "standard" of the standard application namespace is not typically assigned to a deployed application.

The standard application event namespace also defines a namespace extension such as event-based application framework and defines events that are used by framework applications, i.e., generated and registered for notification. For example, a designated resource name is "standard" and the absolute event identifier for an application takes the format:
event:///standard/app/<event name>

The portion of hierarchical namespace 600 associated with these identifiers is branch "/standard". One example of a standard event in hierarchical namespace 600 is event:///standard/app/S_Event_1 (FIG. 6).

Application-defined events 506, as previously described, typically are defined as required by an application's domain, e.g., an event applicable to a specific event-producing application.

A resource name is assigned to designate an event namespace particular to the event-producing application of the event, i.e., an application-defined resource name, e.g., app1 to appN in FIG. 6. In the above example, the designated resource name was used as the actual resource name, e.g., "purse."

Event name 706 includes an identifier for an event in a specific set of events within event objects set 308. Each event name is unique within a respective resource namespace, i.e., the event namespace of the resource that owns the event. Each resource name is unique at a host level.

Typically, on resource-constrained devices, applications that utilize servlets are assigned unique names such as the names assigned above. However, applet-based applications are uniquely identified by an application identifier (AID). The term "AID" is defined by International Standards Organization (ISO) Standard ISO-IEC 7816-C, which is incorporated herein by reference as evidence of the knowledge of one of skill in the art. An AID is an array of bytes that is interpreted in two distinct pieces: (1) a resource identifier (RID); and (2) a proprietary identifier extension (PIX).

A RID typically comprises five bytes. A PIX typically comprises up to eleven bytes. For example, an applet application carries the AID a00000006203010c, where the RID comprises "a000000062" and the PIX comprises "03010c". Using the AID for an applet application as the resource name for that applet application allows applet applications to be easily added to namespace 600.

For example, if an applet has an AID of "a00000006203010c," the absolute event identifier takes the format:
event://aid/a000000062/03010c/<event name> where "aid" is a registry-based authority for aid-based URI.

While an AID is not formally a URI, it can be used to identify the application-specific namespace for events owned by that application.

Relative Event Identifiers

Relative event identifiers 710 identify events using an abbreviated form of absolute event identifier 708, e.g., relative to a resource name. In this manner, relative event identifiers provide concise designations for efficient programming and name resolution.

Relative event identifiers include event name 710 and, optionally, resource name 704. Thus, a relative event identifier takes the form:
<resource name><event name>, where the resource name is optional. To illustrate, a relative event identifier is:
/purse/debited where "purse" is the resource name for an event-producing application; and "debited" is the event name owned by resource "purse". The "purse" application is unique at the host level, e.g., with respect to resource-constrained device 200A. Event "debited" is unique at the resource level, e.g., with respect to application "purse."

To illustrate, another relative event identifier is:
debited where event "debited" is specified relative to the application context root, e.g., /purse.

Dynamic Event Listener Registrar

Registrar 302 provides an interface for registering and unregistering event-consuming applications and associated event listeners that listen for events in events object set 308. Each event listener is associated with an event-consuming application. Event-consuming applications include, for example, the platform; applications on resource-constrained device 200A; off-card applications on a remote device.

To register for events with generic event notification service 204, an application provides a registration request to registrar 302. The registration request includes:

a) the event source—the URI identifying the event-producing application;

b) the event type or URI for which the listener object should be invoked; and c) a listener object, which handles the event notification.

For example, to listen for an application-defined event "debited" fired by application "purse", an event-consuming application sends:
eventNotificationService.addListener("/purse", "event:///purse/debited", listener).

To listen for a standard application event "Started" fired by application "purse," an event-consuming application sends:
eventNotificationService.addListener("/purse", "event:///standard/app/Started", listener).

To listen for a platform event "Reset," an event-consuming application sends:
eventNotificationService.addListener("/platform", "event:///platform/Reset", listener).

An example of an event listener interface is:
public interface EventListener {void notify(Event e);
}

An event-consuming application may also register for notification of events on resources such as files, objects such as Binary Encoded Resource—Tag Length Value (BER-TLV) data objects, etc., so long as these resources are supported on resource-constrained device 200A. An event-consuming application may, for example, listen for events on a resource by specifying:

a) a listener object, which can handle the event notification;
 b) an event source—that is the resource URI which identifies the resource, e.g., for a platform-wide resource, such as file /foo/bar, file:///foo/bar, or for an application-specific resource, such as the file /transactionlog for application transit, file:///transit/transactionlog; and c) the event type or URI for which the listener should be invoked, e.g., event:///standard/resource/Created.

For example, to listen for a resource-defined standard event "Created" fired by file /foo/bar, an event-consuming application sends:

eventNotificationService.addListener (
 "file:///foo/bar",
 "event:///standard/resource/Created", listener).

To listen for a resource-defined standard event "Update" fired by file /transit/transactionlog, an event-consuming application sends:

eventNotificationService.addListener ( "file:///transit/transactionlog","event:///standard/resource/Updated", listener).

In one embodiment, registration is subject to access control, i.e., only authorized event-consuming applications can register for event notification from an event-producing application. For example, generic event notification service 204 or alternatively, an access controller on resource-constrained device 200A, determines whether the event-consuming application complies with the requirements for registration.

In the embodiment of FIG. 3, registrar 302 and dynamic event notification registry 304 are used in determining whether the request of the event-consuming application to register, i.e., a registration request, complies with the security policy implemented by generic event notification service 204. Registrar 302, in one embodiment, checks an access control list of access control lists 304B in registry 304 to determine whether the event-consuming application registering for event notification is authorized to receive notifications of instances of the specified event from the event-producing application.

As explained above, in one embodiment, registry 304 includes a different access control list for each event-producing application that has been deployed. Thus, in this embodiment, access control lists 304B include a plurality of access control lists. As explained more completely below, for a particular event-producing application, the access control list for that event-producing application includes an identifier for the associated event-producing application and entries for event identifiers. Each entry with an event identifier further includes identifiers for event-consuming applications, or groups of event-consuming applications, authorized to receive notification of the event in that entry.

Alternatively, the access control list for each event-producing application can be included in a single list, which is also referred to as the access control list.

In one embodiment, an access control list is a part of a declarative security section of a deployment descriptor for the event-producing application. The deployment descriptor conveys the elements and configuration information of an application between the different actors during an application lifecycle. Actors include application developers, application assemblers, and deployers.

In addition to, or alternatively to, access control lists, protection domains can be used to implement security during registration, sometimes called subscription. Under this security policy, the event-consuming application is bound to a protection domain specifying a list of granted permissions. The registration operation may be subject to a permission. The permission for the registration operation may specify a source (or source category) and the event (or event category) for which the permission is granted.

Security provided by the protection domains configured on resource-constrained device 200A prior to an application deployment/provisioning and access control lists (declarative security) declared in the application deployment descriptor are complementary. Protection domains are more coarse-grained, since a protection domain may be defined for a category of applications. Access control lists are intended to be more fine-grained, since access is declared for a specific application.

Hence, in these embodiments, security requirements can be specified and enforced with up to an event granularity and according to event producing and event consuming. Event notification subscription or registration is subject to a policy-based security control allowing an application developer to explicitly designate the applications, the categories of applications, or other event consumers, which can register for events fired by that application. For each event-producing application, a list of allowed event-consuming applications for each produced event can be configured. This configuration is typically a deployment-time configuration.

Additionally, an event-consuming application must declare the events that the event-consuming application wants to listen to so that at deployment-time, prior to being loaded, registrar 302, or alternatively an access controller (or its policy manager) can check that the permissions the event-consuming application is requesting—in terms of events the event-consuming application wants to listen to—are granted in the protection domain to which the application is bound.

For each event produced by an event-producing application, a list of allowed event-consuming applications may be specified. The list of allowed event-consuming applications may be precisely known when an application is intended to be only one of multiple applications interacting together in a more complex integrated solution and when the events exchanged are to be kept private among the concerned applications. When there are no restrictions on the event-consuming applications, i.e., when any application can listen to events fired by an event-producing application, the access can be granted. In this embodiment, event access (event listener registration to an event) is "deny" by default and that event listener capability must be explicitly granted to specific event-consuming applications; to specific categories of event-consuming applications; or to all event-consuming applications.

To unregister from notification for a particular event, the event-consuming application for which the event listener was registered provides an unregistration request to registrar 302. The unregistration request includes information such as identification for the particular event listener to be removed for either the event type or the event identifier. Registrar 302 looks up the entry in registry 304 corresponding to the provided information and removes the corresponding event listener.

Registrar 302 removes an entry on behalf of an event-consuming application only if the event-consuming application requesting unregistration owns the event listener to be unregistered, i.e., the event-consuming application that originally provided the event listener for registration. In this manner, the integrity of unregister operations is ensured.

Register 304 may also include methods to remove all the event listeners for a particular event type at once.

In one embodiment, a registered event listener has the same persistence properties as the corresponding event-consuming application. For example, the event listener is persistent from the time of registration until the event-consuming application is unloaded/uninstalled, unless the event listener is selectively unregistered by the event-consuming application.

In a case where the event-consuming application is unloaded, all entries for event listeners registered on behalf of the event-consuming application are removed from registry 304, as well.

Dynamic Event Notification Registry

In this embodiment, registry 304 includes a registration list 304A (FIGS. 4 and 8) and access control lists 304B. (FIGS. 4 and 9).

Registration List Entries

Figure 8:
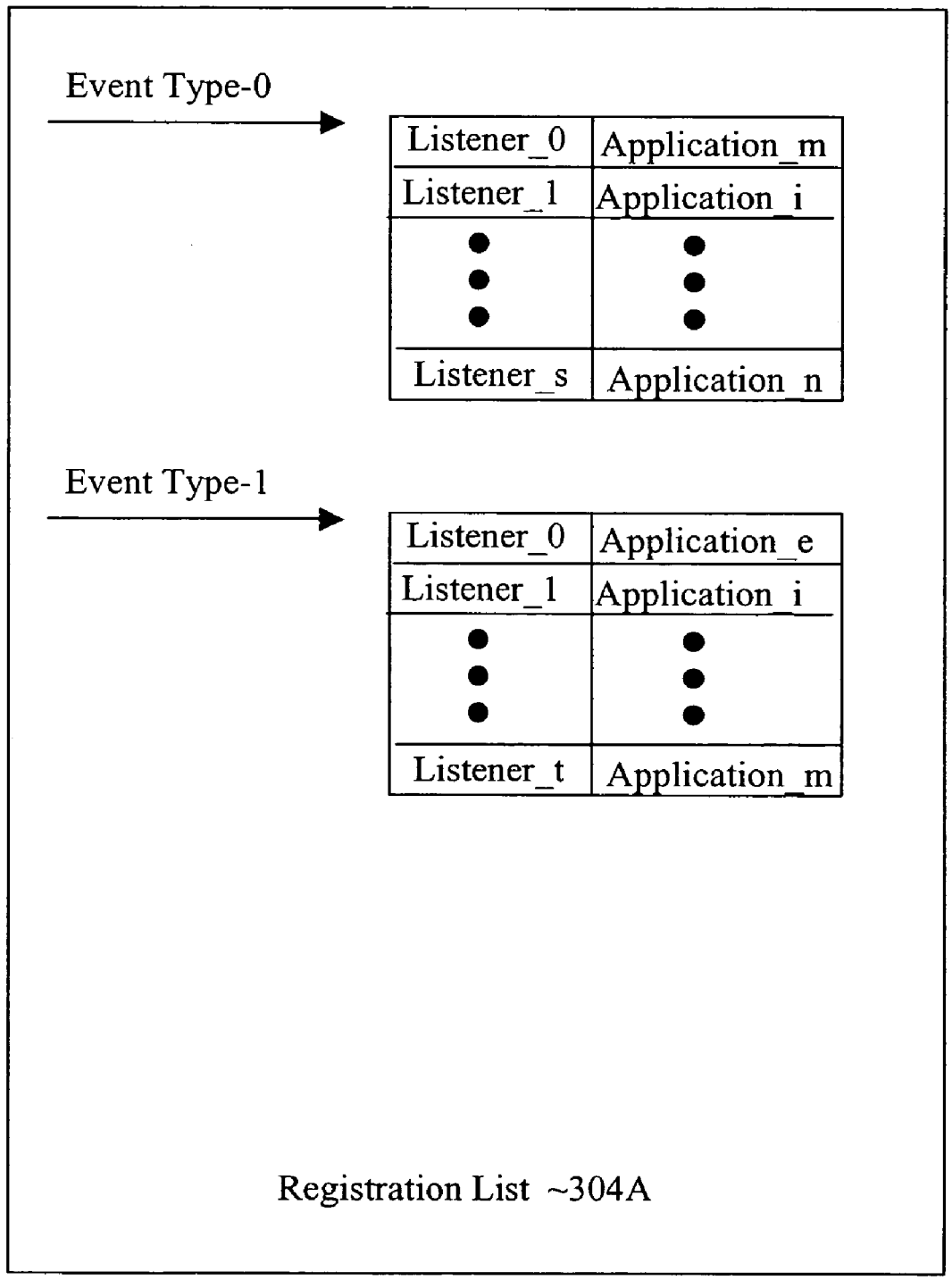
FIG. 8 illustrates a registration list of a dynamic event notification registry of the generic event notification service of FIG. 3, according to one embodiment of the present invention.

Registration list 304A of FIG. 8 includes a list of event types, event identifiers, or both. For example, registration list 304A includes a list of event types labeled as Event Type-0, Event Type-1, etc. Each event type is associated with a list of all event listeners to be notified when that event type is fired. For example, the list of event listeners for Event Type-0 includes Listener_0; Listener_1; ... Listener_s. The list of event listeners for Event Type-1 includes Listener_0; Listener_1; ... Listener_t.

Additionally, as illustrated in FIG. 8, for security reasons, an event-consuming application associated with each event listener is listed. For example, Application_m is associated with Listener_0 registered for notification of Event Type-0. Application_m is also associated with Listener_t registered for Event Type-1.

The use of a flat list in FIG. 8 is not intended to limit the invention to use of such a format. Registration list 304A can be implemented in a manner that facilitates use of the list by components of generic event notification service 204.

To facilitate the deployment and re-deployment of applications integrated through generic event notification service 204, registration for notification of events may be allowed even if the actual event-producing applications of these events are not yet deployed. This allows for late binding of applications and facilitates the deployment of interdependent applications.

Moreover, applications involved in such interdependencies can be individually undeployed then redeployed or updated without requiring the complete set of integrated/interdependent applications to be undeployed and redeployed as well. Therefore, event entries in registry 304 may not only be created upon deployment of event-producing applications, but may also be created upon registration of event listeners from event-consuming applications. Additionally, when event-producing applications are undeployed the corresponding event entry in registry 304 may not be removed if the corresponding event listener lists are not empty.

Access Control Lists Entries

As indicated above, optionally, registry 304 includes one or more access control lists. Access control list 304B facilitates permission for an application to register for notification of an event. Access control list 304B includes entries for each event. Each entry further includes a list of event-consuming applications authorized to receive the event.

FIG. 9 is an illustration of an access control list 304B that includes a list of event-producing applications; e.g., Event-producing Application_0, Event-producing Application_1. For each event-producing application, a list of event types, event identifiers, or both are provided. For example, Event-producing Application_0 includes Event-0 and Event-1.

For each event type or event identifier, a list of event-consuming applications authorized to receive the event type listed or the event listed is provided. For example, Application_i is authorized to receive Event Type_0 from Event-producing Application_0.

Since applications are identified in a container by their unique uniform resource identifiers (URIs), event-consuming applications are also identified in access control lists 304B by URIs. Thus, each access control list entry includes an event identifier or event type, and one or more URIs for event-consuming applications authorized to receive that event, sometimes referred to as listener references. The listener references identify applications that can register to listen to the event identified by the event identifier.

The event identifier, previously discussed, identifies a particular event or group of events. Groups of event listeners are specified using a wildcard.

An example of an access control list entry is:

event:///purse/debited : /banking/*, /ual/rewards where event:// is the event namespace identifier and "purse" is the application that generates the event named "debited". The applications authorized to consume event "debited" are: (1) all "banking" applications, such as "/banking/creditcard," as indicated by the "*"; and (2) application "/ual/rewards." In one embodiment, an application or component uses a wildcard format to specify all events with respect to a particular resource. The wildcard format uses an "*" or other character denominating an entire group.

Other examples of access control list entries are:

event:///purse/sensitive/ZeroBalance : /banking/* event:///purse/sensitive/BalanceOverflown : /banking/* event:///purse/dummy/* : *

Note that since the events produced by an application are identified with URIs relative to the application URI in the event scheme namespace, events in this list could also be identified by a relative URI:

sensitive/* : /banking/* debited : /banking/*, /ual/rewards dummy/* : *

In one embodiment, access could also be granted to applications based on their certificate Distinguished Name (DN) or their protection domain. Note that access control lists could be updated after deployment through a privileged API by the event-producing application itself or by the application manager.

Event Forwarder

As described above, event forwarder 306 of generic event notification service 204 is responsible for determining whether an event has been fired by the appropriate application, i.e., is the event in the event namespace of the application, and then for forwarding the event to the appropriate event listeners.

Applications can fire application-defined events using generic event object instances or instances of application-specific implementations or specializations of generic event objects with assigned application-defined event URIs, i.e., URIs from the application's own namespace. For example:

GenericEvent veryRichEvent=new
GenericEvent("/purse/CashOverflow");

Note that the source of the event, i.e., the event-producing application firing the event, is securely set by the underlying implementation. Only one instance of an event is created when the event-producing application fires that event.

In one embodiment, the security policy implemented by event forwarder 306 prevents forwarding of an event fired by an application when that event is not from either the event namespace of that application or the standard application event namespace. Moreover, an application cannot fire a platform event. An application attempting to fire an event with a URI either from the platform namespace or another application's namespace results in an exception being thrown.

An application is also prevented by the application programming interface from impersonating another application by altering the source of the event, i.e., the event source is automatically and securely set by the implementation and cannot be changed by an application. A first application cannot impersonate the platform or any other application by, for example, forwarding an event the first application previously received from another source. Thus, the event source is always checked against the caller of a method notify that causes the event to be forwarded to registered event listeners for that event. A mismatch between the event source and the caller may result in an exception being thrown.

Thus, event forwarder 306 ensures that the event comes from the source authorized to generate the event, sometimes referred to as an authorized source. Event forwarder 306 also ensures that the event has not been altered to appear as if the event comes from an authorized source when, in fact, the event comes from a source other than an authorized source.

To illustrate, event forwarder 306 compares the name of the event-producing application firing the events in the namespace for that event producing application. If a determination is made that the application name matches the resource name in the namespace, event forwarder 306 continues operations. If the event-producing application name and the resource name do not match, event forwarder 306 throws an exception. In this manner, the integrity of event generation and forwarding is ensured.

Event forwarder 306 also provides an interface for forwarding events to authorized event listeners and/or to event router 310. In one embodiment, event forwarder 306 receives an event and looks up entries in registration list 304A of registry 304 to identify event listeners listening for the received event or for events of the same type as the received event.

Event forwarder 306 invokes the identified event listeners and passes the event as a parameter to the invoked event listeners. For each invoked event listener, listener code is executed in the associated event-consuming application's context.

More particularly, upon event generation by an event-producing application, an event listener or event listeners registered by an event-consuming application execute within the context of the event-consuming application. Since the events are Shareable Interface Objects of the event-producing applications, context switches from the event-consuming application's context to the event-producing application's context occur when-event listeners of event-consuming applications invoke methods on the event objects. The firewall associated with an application's context enforces standard security containment between two applications, yet permits the two applications to intercommunicate via the Shareable Interface Objects.

In one embodiment, event forwarder 306 invokes the event listeners in sequence; however, the order of invocation is non-deterministic. Some applications or application frameworks may require a deterministic order of notification. A deterministic order of notification—such as notification in the order of registration—cannot be guaranteed on a system-wide basis for a multi-threaded platform with dynamic event registration. Nevertheless, a deterministic order of registration can be implemented on an application-wide basis, i.e., event listeners registered by the same application will be notified in the same order the event listeners have been registered. This can be implemented directly by generic event notification service 204 and be systematic or can be provided as an optional feature.

Thus, in one embodiment, event forwarder 306 provides a deterministic order of notification on an application-wide basis. Put another way, event listeners registered by the same event-consuming application are notified in the same order as the event listeners were registered.

In this embodiment, a deterministic order of notification is implemented by registration of a batch of event listeners. A batch of event listeners is an ordered list of event listeners to be registered as a whole, i.e., registered at one time. Each event listener in the batch of event listeners is notified in the same order as listed in the ordered list. While the order of notification for batches of event listeners and regular event listeners cannot be guaranteed, the order of notification of event listeners in a batch is guaranteed.

In one embodiment, registry 304 maintains a per-application list of event listeners to facilitate notification by batch. To illustrate, a batch of event listeners is implemented as a helper class implementing an event listener interface:

```
public class ListenerBatch implements EventListener {
    private EventListener[ ] listeners;
    // . . .
    public void notify(Event e) {
        for (int i=0; i<listeners.length; i++) {listeners[i].notify(e);
        }
    }
}
```

Event Router

Event router 310 is an optional component used to facilitate inbound and outbound communications to and from resource-constrained device 200A. Event router 310 tunnels inbound events and outbound events over HTTP, HTTPS, or other communication protocols. An inbound event is an event generated by an off-card application and destined for resource-constrained device 200A. An outbound event is an event generated by an on-card application and destined for a remote device. In one embodiment, for example, event router 310 is implemented at the application level. In this manner, secure, efficient communications between on-card applications 210 of resource-constrained device 200A and remote applications of various remote devices are enabled.

More particularly, inbound events are tunneled through communication protocols to be fired through generic event notification service 204 to event listeners registered on behalf of on-card applications. Event router 310 unwraps the inbound event and dispatches the unwrapped inbound event to event forwarder 306 for processing as previously described. In this manner, flexibility and security of communications are enhanced.

In one embodiment, event router 310 is implemented as a dedicated servlet application that is part of an optional extension. In this manner, event router 310 provides platform extensibility by third parties, e.g., European Telecommunications Standard Institute (ETSI).

A dedicated servlet, e.g., servlet/router, maps events from an external URI such as http://<hostname>/router/ext-app/event1 to the URI event scheme. The event identifier for an inbound event includes an event namespace identifier, a router name, a resource name identifying an off-card application, and an event name. Thus, an inbound event identifier takes the form:

<event namespace identifier><router name><resource name><event name>

One example of an event identifier of an event routed to the dedicated servlet "router" is:

event:///router/ext-app/event1 where event:// is the event namespace identifier "router" is the name of the dedicated servlet; "ext-app" is the resource name corresponding to an off-card application; and "event1" is the event name.

In the foregoing example, the dedicated servlet is rooted at http://<hostname>/router. In the foregoing example, the resource name "ext-app" does not correspond to an application deployed on resource-constrained device 200A, but to an off-card application. In this manner, a GSM Toolkit implementation on resource-constrained device 200A, for example, is able to use generic event notification service 204.

To illustrate, event router 310 bridges a toolkit event named http://<hostname>/router/gsm/menu_selection to event:///router/gsm/menu_selection.

In another embodiment, a GSM Toolkit extension is standardized on resource-constrained device 200A, and the GSM Toolkit events are allocated in a standard application event namespace, e.g., event:///standard/gsm/menu_selection. Use of the standard application event namespace allows application /router to fire the GSM Toolkit events even if the GSM Toolkit events are not in the event namespace of application /router.

In one embodiment, event router 310 additionally implements any required protocol with the off-card applications such as an external entity querying the list of events fired by an on-card application.

Since inbound events are mapped to on-card events having well-defined URIs, security is enforced on the same basis as other on-card applications. Put another way, an on-card application may or may not be allowed to listen for events routed from off-card applications through event router 310, i.e., an inbound event. In one embodiment, an on-card event-consuming application's permissions to listen for inbound events are governed by event router 310 and/or access control lists of the event-producing application of the event.

Similarly, off-card applications, via event router 310, may or may not be allowed to register for events an on-card event-producing application fires, as determined by the on-card event-producing application's access control lists.

In one embodiment, event router 310 further implements and enforces a security policy complementary to that of on-card application's access control lists. For outbound events, an operation similar to that described for routing inbound events is implemented.

In one embodiment, event forwarder 306 checks the event identifier of a fired event to verify authorization of the firing source. Event forwarder 306 checks the registration list to determine if any off-card applications have event listeners registered for receipt of the event. If so, event forwarder 306 forwards the event to event router 310. Event router 310 bridges the event identifier from a specific URI event scheme to a general URI scheme, previously described, for routing to the destination event-consuming application, i.e., the off-card application.

To illustrate, event router 310 bridges an outbound event from an on-card application named event:///app1/event1 to an external resource identifier (URL) http://<remote-hostname>/ext-app?event=/app1/event1 for delivery to an off-card application, assuming that the off-card application has registered for the event and is reachable at http://<remote-hostname>/ext-app. Since the security policy implemented by generic event notification service 204 does not prevent router 310 from forwarding events indiscriminately to any external applications, event router 310, in one embodiment, implements and enforces a complementary security policy.

Spontaneous Application Activation

In one embodiment, generic event notification service 204 provides dynamic registration of event listeners, i.e., event listeners are dynamically registered upon deployment of an event-consuming application. However, generic event notification service 204 does not automatically start or restart an application upon insertion of resource-constrained device 200A into a reader, for example, or upon reset of resource-constrained device 200A.

To setup an application for spontaneous application activation, i.e., automatic start or restart of an application upon a platform reset, application initialization code must first lookup generic event notification service 204 and register a platform reset event listener.

Note that the use of a platform reset event listener is not restricted to spontaneous application activation and can be used jointly with regular request handling. Upon activation, an application may start a background daemon service in a separate thread, if allowed by the security policy of resource-constrained device 200A.

Illustrative Embodiment of a Method of Generic Event Notification

Figure 10:
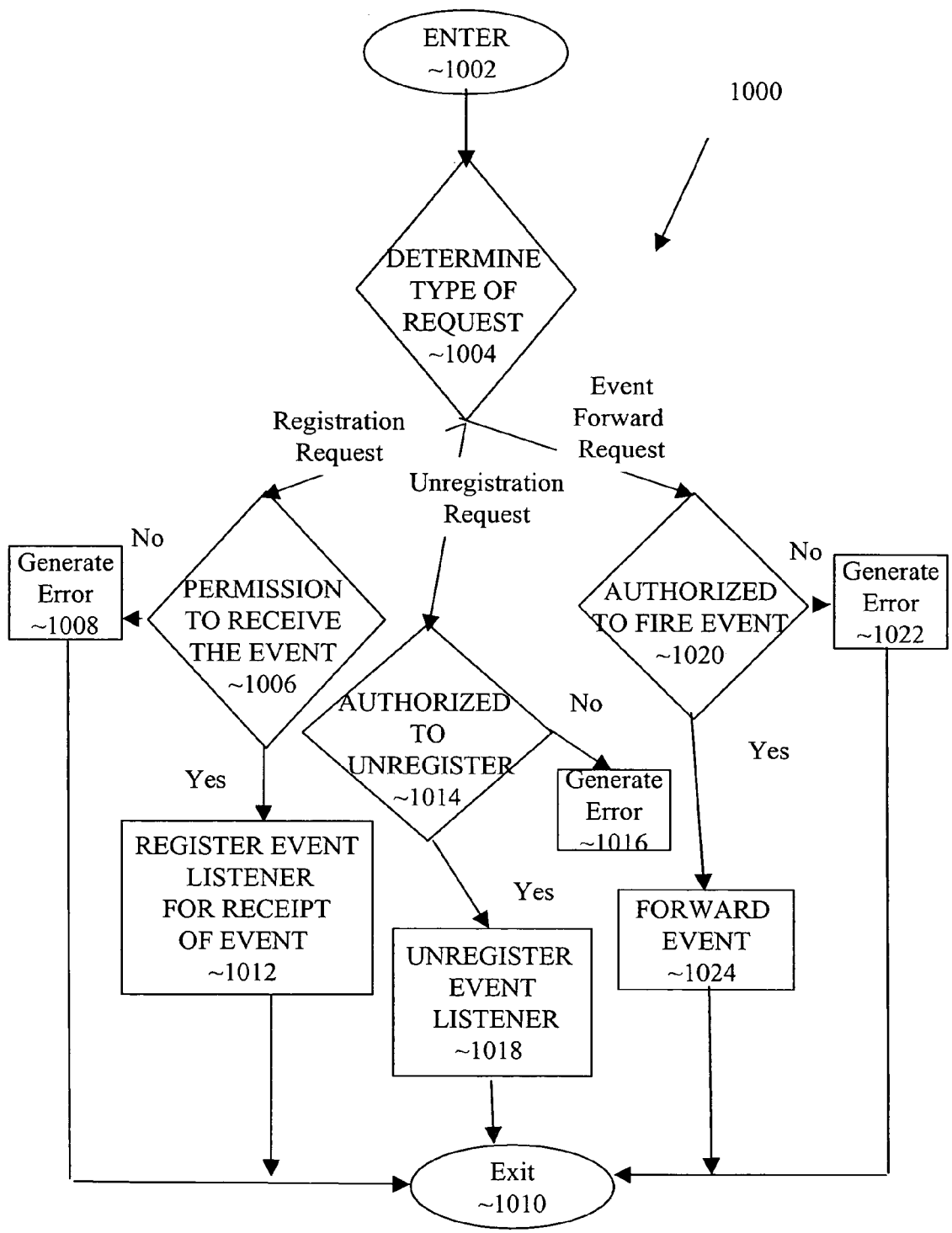
FIG. 10 illustrates a generic event notification method, according to one embodiment of the present invention.

FIG. 10 illustrates a generic event notification method 1000, according to one embodiment of the present invention. With reference now to FIG. 10, invocation of generic event notification service 204 results in generic event notification method 1000, as described below in one embodiment.

From an ENTER OPERATION 1002, flow moves to a DETERMINE. TYPE OF REQUEST CHECK OPERATION 1004. In DETERMINE TYPE OF REQUEST CHECK OPERATION 1004, a determination is made of the type of request received from a source. The types of requests, previously described, include: (1) a registration request to register an event listener; (2) an unregistration request to unregister an event listener; and (3) an event forward request to forward an event.

Upon a determination that the request is a registration request, flow moves from DETERMINE TYPE OF REQUEST CHECK OPERATION 1004 to a PERMISSION TO RECEIVE THE EVENT CHECK OPERATION 1006. In PERMISSION TO RECEIVE THE EVENT CHECK OPERATION 1006, an access control list, previously described, is checked to determine if the event-consuming application requesting registration of an event listener is permitted to receive the event or type of event for which registration is sought.

Upon a determination that the event-consuming application is not permitted to receive the event or type of events for which registration is sought, flow moves to a GENERATE ERROR OPERATION 1008, where an exception is thrown. From GENERATE ERROR OPERATION 1008, flow exits in an EXIT OPERATION 1010.

Upon a determination made in PERMISSION TO RECEIVE THE EVENT CHECK OPERATION 1006 that the event-consuming application is permitted to receive the event or type of events for which registration is sought, flow moves from PERMISSION TO RECEIVE THE EVENT CHECK OPERATION 1006 to a REGISTER EVENT LIS- TENER FOR RECEIPT OF EVENT OPERATION 1012. In REGISTER EVENT LISTENER FOR RECEIPT OF EVENT OPERATION 1012, the event listener is registered, as previously described.

From REGISTER EVENT LISTENER FOR RECEIPT OF EVENT OPERATION 1012; flow moves to EXIT OPERATION 1010.

Upon a determination in DETERMINE TYPE OF REQUEST CHECK OPERATION 1004 that the request is an unregistration request, flow moves from DETERMINE TYPE OF REQUEST CHECK OPERATION 1004 to an AUTHORIZED TO UNREGISTER CHECK OPERATION 1014. In AUTHORIZED TO UNREGISTER CHECK OPERATION 1014, a determination is made if the source of the unregistration request is authorized to issue an unregistration request for the event listener in question, as previously described.

Upon a determination that the source of the unregistration request is not authorized to issue an unregistration request for the referenced event listener, flow moves to a GENERATE ERROR OPERATION 1016, where an exception is thrown. From GENERATE ERROR OPERATION 1016, flow exits in EXIT OPERATION 1010.

Upon a determination that the source of the unregistration request is authorized to issue an unregistration request for the referenced event listener, flow moves to an UNREGISTER EVENT LISTENER OPERATION 1018. In UNREGISTER EVENT LISTENER OPERATION 1018, the referenced event listener is unregistered.

From UNREGISTER EVENT LISTENER OPERATION 1018, flow exits in EXIT OPERATION 1010.

Upon a determination in DETERMINE TYPE OF REQUEST CHECK OPERATION 1004 that the request is an event forward request, previously described, flow moves from DETERMINE TYPE OF REQUEST CHECK OPERATION 1004 to an AUTHORIZED TO FIRE EVENT CHECK OPERATION 1020. In AUTHORIZED TO FIRE EVENT CHECK OPERATION 1020, a determination is made whether the event identifier of the fired event is from the event namespace for the event-producing application associated with that event.

Upon a determination that the event identifier of the fired event is not from the event namespace for the event-producing application associated with that event, flow moves to a GENERATE ERROR OPERATION 1022, where an exception is thrown. From GENERATE ERROR OPERATION 1022, flow exits in EXIT OPERATION 1010.

Upon a determination that the event identifier of the fired event is from the event namespace for the event-producing application associated with that event, flow moves to a FORWARD EVENT OPERATION 1024. In FORWARD EVENT OPERATION 1024, the registry entries for the fired event or type of fired event are looked up, and all the event listeners registered for the event, or type of event, are invoked.

From FORWARD EVENT OPERATION 1024, flow exits in EXIT OPERATION 1010.

One skilled in the art will recognize that generic event notification method 1000 may include various combinations of operations, and the present invention is not limited to the particular embodiment described.

Retrieving Generic Event Notification Service

In one embodiment, an application is able to retrieve generic event notification service 204 using a static method of the class implementing the service, or of other system (JCRE) classes, returning the singleton instance of the service. For example:

```
public abstract class EventNotificationService {
    public static EventNotificationService
    getInstance( );
    // . . .
}
```

The service instance returned, despite being a singleton, may nevertheless provide a restricted view to the actual service according to the application's context.

Compared to retrieving generic event notification service 204 through, for example, a method of the context of a servlet-based application, this technique allows for a uniform way for both servlet-based applications and applet-based applications to retrieve the service. Moreover, this method is IDE-friendly since it does not require modifying the Servlet API such as when allowing retrieval of generic event notification service 204 via a method ServletContext.

Since the service retrieved by an application may actually be a restricted/filtered view on the actual service bound to the application context, the service may be implemented as a central registry, as well. A central registry is implemented so that the registry is actually distributed on all the applications as per-application registries. When firing an event, the service actually looks up event listeners in all these per-application registries. This facilitates removing event listeners upon undeployment of their associated event-consuming application. An example of a generic event notification service interface is:

```
public abstract class EventNotificationService {
    public static EventNotificationService getInstance( );
    public static final String SOURCE_PLATFORM=null;
    // or / or /platform
    public static final String SOURCE_ANY=new String( );
    public abstract void addListener(String sourceURI, String
        eventURI, EventListener 1);
    public abstract void removeListener(String sourceURI,
        String eventURI, EventListener 1);
    public abstract void notifyListeners(Event e);
    // public abstract void registerEvents(String sourceURI,
        String[ ] eventURIs);
    // public abstract void unregisterEvents(String sourceURI,
        String[ ] eventURIs);
    // public abstract String[ ] queryRegisteredEvents(String
        sourceURI)
```

Those skilled in the art readily recognize that in this embodiment the individual operations mentioned before in connection with generic event notification method 1000 are performed by executing computer program instructions on a processor (not shown) of resource-constrained device 200A. In one embodiment, a storage medium (not shown) has thereon installed computer-readable program code for method 1000, and execution of the computer-readable program code causes the processor of resource-constrained device 200A to perform the individual operations explained above.

Herein, a computer program product comprises a medium configured to store computer readable code for method 1000 or in which computer readable code for method 1000 is stored. Some examples of computer program products are CD-ROM discs, ROM cards, floppy discs, magnetic tapes, computer hard drives, and servers on a network.

In view of this disclosure, method 1000 can be implemented in a wide variety of computer system configurations using an operating system and computer programming language of interest to the user. In addition, method 1000 could be stored as different modules in memories of different devices. For example, method 1000 could initially be stored in a server computer, and then as necessary, a module of method 1000 could be transferred to resource-constrained device 200A and executed on resource-constrained device 200A. Consequently, part of method 1000 would be executed on the server processor, and another part of method 1000 would be executed on the processor of the client device.

In yet another embodiment, method 1000 is stored in a memory of another computer system. Stored method 1000 is transferred over a network to memory (not shown) in resource-constrained device 200A.

Method 1000 is implemented, in one embodiment, using a computer program. The computer program may be stored on any common data carrier like, for example, a floppy disk or a compact disc (CD), as well as on any common computer system's storage facilities like hard disks. Therefore, one embodiment of the present invention also relates to a data carrier for storing a computer program for carrying out the inventive method. Another embodiment of the present invention also relates to a method for using a computer system such as resource-constrained device 200A for carrying out method 1000. Still another embodiment of the present invention relates to a computer system with a storage medium on which a computer program for carrying out method 1000 is stored.

While method 1000 has been explained previously in connection with one embodiment thereof, those skilled in the art will readily recognize that modifications can be made to this embodiment without departing from the spirit and scope of the present invention.

We claim:

1. A method implemented in a resource-constrained device, said method comprising:
    receiving, by a generic event notification service executing on said resource-constrained device, a registration request to register an event listener for receipt of an event,
        wherein said event listener is associated with an event-consuming application executing on said resource-constrained device;
        said event listener is executed in a context of said event-consuming application; and
        said event is one of (i) an event in a set of predefined events provided by said generic event notification service and (ii) an application-specific event, wherein said set of predefined events includes a resource-constrained device platform event and a standard application event;
    registering, by said generic event notification service, said event listener for receipt of said event even though said generic event notification service finds that an event-producing application for said event is not yet deployed thereby allowing the late binding of said event-producing application;
    receiving, by said generic event notification service executing on said resource-constrained device, an event fired by a first event-producing application executing on said resource-constrained device, wherein said event fired by said first event-producing application is a fired event, and said fired event has a unique event identifier, and further wherein said generic event notification service controls communications between applications, executing on said resource-constrained device, using events; and
        said fired event comprises a shareable interface object, wherein said shareable interface object allows an application executing in a first context, different from a second context in which said first event-producing application is executing, to communicate directly with said first event-producing application by bypassing a firewall separating said first and second contexts;
    determining, by said generic event notification service, whether said first event-producing application is authorized to fire said fired event;
    determining, by said generic event notification service, event-consuming applications authorized by said first event-producing application to receive said fired event upon said generic event notification service finding said first event-producing application is authorized to fire said fired event; and
    forwarding, by said generic event notification service, said fired event to each event-consuming application authorized by said first event-producing application to receive said fired event, wherein each event-consuming application can communicate directly with said first event-producing application using said fired event to bypass said firewall.

2. The computer-implemented method of claim 1, further comprising:
    determining, by said generic event notification service in response to said registration request, if said event-consuming application is authorized to receive said event.

3. The computer-implemented method of claim 2, wherein said registering, by said generic event notification service, said event listener for receipt of said event is performed upon said generic event notification service finding said event-consuming application is authorized to receive said event.

4. The computer-implemented method of claim 3, wherein said forwarding, by said generic event notification service, said fired event to each event-consuming application authorized by said first event-producing application to receive said fired event comprises:
    forwarding said fired event to said event listener upon a determination that said event listener is registered to receive said fired event.

5. The computer-implemented method of claim 3, wherein said registering, by said generic event notification service, said event listener for receipt of said event comprises:
    registering a platform reset event listener, wherein said platform reset event listener is used in conjunction with spontaneous application activation.

6. The computer-implemented method of claim 3, further comprising:
    unregistering said event listener upon receipt, by said generic event notification service, of an unregistration request to unregister said registered event listener.

7. The computer-implemented method of claim 1, wherein said method further comprises:
    receiving, by said generic event notification service executing on said resource-constrained device, another event fired by a second event-producing application executing remotely from said resource-constrained device; and
    generating, by said generic event notification service, a unique event identifier, conforming to a Uniform Resource Identifier (URI) event scheme, for said another event.

8. The computer-implemented method of claim 1, wherein said forwarding, by said generic event notification service, said fired event to each event-consuming application authorized by said first event-producing application to receive said fired event comprises:
    forwarding, by said generic event notification service, said fired event to a second application executing on a remote device.

9. The computer-implemented method of claim 1, wherein said method further comprises:
 comparing a registered source of said fired event with said first event-producing application to determine whether said first event-producing application is impersonating said registered source.

10. The computer-implemented method of claim 1, further comprising:
 entering an access list for said first event-producing application in a registry of said generic event notification service upon deployment of said first event-producing application.

11. A computer product having stored thereon computer-readable instructions for a generic event notification service, which when executed by a resource-constrained device performs a method comprising:
 receiving, by said generic event notification service executing on said resource-constrained device, a registration request to register an event listener for receipt of an event,
  wherein said event listener is associated with an event-consuming application executing on said resource-constrained device;
  said event listener is executed in a context of said event-consuming application; and
  said event is one of (i) an event in a set of predefined events provided by said generic event notification service and (ii) an application-specific event, wherein said set of predefined events includes a resource-constrained device platform event and a standard application event;
 registering, by said generic event notification service, said event listener for receipt of said event even though said generic event notification service finds that an event-producing application for said event is not yet deployed thereby allowing the late binding of said event-producing application;
 receiving, by said generic event notification service executing on said resource-constrained device, an event fired by a first event-producing application executing on said resource-constrained device, wherein said event fired by said first event-producing application is a fired event, and said fired event has a unique event identifier, and
  further wherein said generic event notification service controls communications between applications, executing on said resource-constrained device, using events; and
  said fired event comprises a shareable interface object, wherein said shareable interface object allows an application executing in a first context, different from a second context in which said first event-producing application is executing, to communicate directly with said first event-producing application by bypassing a firewall separating said first and second contexts;
 determining, by said generic event notification service, whether said first event-producing application is authorized to fire said fired event;
 determining, by said generic event notification service, event-consuming applications authorized by said first event-producing application to receive said fired event upon said generic event notification service finding said first event-producing application is authorized to fire said fired event; and
 forwarding, by said generic event notification service, said fired event to each event-consuming application authorized by said first event-producing application to receive said fired event, wherein each event-consuming application can communicate directly with said first event-producing application using said fired event to bypass said firewall.

\* \* \* \* \*

UNITED STATES PATENT AND TRADEMARK OFFICE
CERTIFICATE OF CORRECTION

PATENT NO.        : 7,711,783 B1
APPLICATION NO.   : 11/454318
DATED             : May 4, 2010
INVENTOR(S)       : Thierry Violleau et al.

Page 1 of 1

It is certified that error appears in the above-identified patent and that said Letters Patent is hereby corrected as shown below:

In column 7, line 16, delete "Java Card'" and insert -- Java Card™ --, therefor.

In column 10, line 35, delete "getURI( ){return uri;}" and insert -- getURI( ) {return uri;}, --, therefor.

In column 21, line 10, delete "identifier" and insert -- identifier; --, therefor.

Signed and Sealed this
Second Day of August, 2011

David J. Kappos
*Director of the United States Patent and Trademark Office*